(12) United States Patent
Jewell

(10) Patent No.: US 7,657,515 B1
(45) Date of Patent: Feb. 2, 2010

(54) HIGH EFFICIENCY DOCUMENT SEARCH

(75) Inventor: Andrew Donaldson Jewell, Cincinnati, OH (US)

(73) Assignee: Alexa Internet, San Francisco, CA (US)

( * ) Notice: Subject to any disclaimer, the term of this patent is extended or adjusted under 35 U.S.C. 154(b) by 388 days.

(21) Appl. No.: 11/694,681

(22) Filed: Mar. 30, 2007

(51) Int. Cl.
G06F 17/30 (2006.01)

(52) U.S. Cl. .................. 707/3; 707/100; 707/101; 707/102

(58) Field of Classification Search .......... 707/3, 707/100–102
See application file for complete search history.

(56) References Cited

U.S. PATENT DOCUMENTS 7,171,403 B2 * 1/2007 Maxwell, III ........... 707/3
2005/0278321 A1 * 12/2005 Vailaya et al. ........... 707/3
2008/0010268 A1 * 1/2008 Liao et al. ................. 707/5

* cited by examiner

*Primary Examiner*—Sana Al-Hashemi
(74) *Attorney, Agent, or Firm*—Knobbe, Martens, Olson & Bear LLP

(57) ABSTRACT

A computer-implemented search method and system is provided whereby a file is received including a query, typically for trademark search, having a first list of query terms and a second list of industry terms. The first and second lists may include tens or hundreds of terms. An AND-OR tree is constructed to represent the query terms and the industry terms and traversed to logically combine each of the query terms with each of the industry terms to form sub-queries which are executed in parallel. The results from each sub-query execution are limited according to a sub-query result limit. The sub-query results are combined to construct a query result for the original query included in the file. Duplicate results are removed from the query result and an ordinal number is included for each term in the query result before returning the query result.

52 Claims, 10 Drawing Sheets

HIGH EFFICIENCY DOCUMENT SEARCH

FIELD

The present disclosure relates to document searching and, more particularly, to electronic document searching.

BACKGROUND

The ubiquity of computers in business, government, and private establishments has resulted in the availability of massive amounts of information from network-connected sources, such as data stores accessible through the World Wide Web, also called the Internet. The availability of and dependency on such massive amounts of information necessitate effective search techniques in order to accurately find documents containing desired information. In recent years, computer search methods and tools have become widely available. Most computer search tools depend on search engines. Search engines are software components that take as input a query from a user, conduct a search based on the query, and return search results to the user. Internet search engines may be implemented as special sites on the World Wide Web that help users find information stored on other Web sites.

Search engines index information, such as keywords, attributes, text, etc., that the search engines conclude describe the content of documents, including any locally stored documents, files, etc., and network-stored documents, i.e., Web pages. Subsequently, search queries supplied by the user to the search engine are compared against the index to direct the user to documents that likely contain information of interest to the user. As the number of search engine queries and the amount of content indexed by a search engine increase, it becomes more difficult to efficiently and accurately return the results of a search. The acceptability of the results returned by a search engine are highly dependent on the amount of information included in the returned results and how the returned results are presented to a user. Limiting search results can be as important as not missing any relevant results. For example, limiting search results to include only focused information of interest to the user or presenting the results in a way that helps the user more quickly evaluate the results can increase the quality of the results.

In addition to general-purpose search engines, special-purpose search engines and/or indexed information exist to serve special search needs. One example is trademark document clearance searches. Trademark document clearance searches are conducted to determine if potential trademarks (or service marks) have been used in a common law and/or a descriptive manner in documents. Trademark document clearance searches differ from general purpose searches in several respects. Trademark document clearance searches are generally conducted by searching documents to determine if they include any one of a list of potential trademarks or service marks in combination with one or more of a list of common industry terms that describe goods or services with which the potential trademark or service mark is to be used. In addition to the marks, the trademark/service mark list may include visual and/or phonetic equivalents. Various types of queries can be formed from the lists. For example, FIG. 2A illustrates a composite query 200 comprising a sequence of separate queries 202, each including a word chosen from each of the two lists—one from the list containing proposed trademarks and the other from the list containing industry terms. In this example, a user seeking to research a trademark for a new drug called "Bitox", is searching variations on the Bitox name, namely, Pitox, Bitos, Bittox, etc., all included in the first list, in combination with applicable industry terms, namely, medication, prescription, treatment, etc., all included in the second list. A single query 210 equivalent to the trademark sequence query of FIG. 2A is depicted in FIG. 2B. FIG. 2B illustrates a single query comprising a Boolean logical combination of the two lists. The FIG. 2B query results in the same number of independent queries as the FIG. 2A query.

Trademark document clearance searches include hundreds of both trademark/service mark variations and industry terms that, when combined, may result in tens of thousands, if not millions, of queries. This combinatorial explosion often makes trademark document clearance searches slow and inefficient because each combination of terms is submitted to the search engine as a separate query. Another potential problem in this kind of search is that redundant search results are often returned by search engines because more than one query matched the same documents. Another potential problem is that the search results may not identify which specific query terms caused the match. Another potential shortcoming is that the distance between the two terms in each query is not provided directly to the user. Generally, the closer the two terms are together, in word distance, the more related the terms are. For example, if a the term "Bitox" is one or two words away from the term "medication," then it can be concluded with a high degree of certainty that Bitox is likely associated with a medication in the related document. Whereas, if the terms "Bitox" and "medication" are separated by several hundred words, the use of Bitox in the document is more likely unrelated to medication.

One way to increase the quality of search results and improve search efficiency is to improve the query process.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A computer-implemented document search based on the terms included in first and second lists of terms is disclosed. The first and second lists may include tens, hundreds, or thousands of terms. An AND-OR or AND-OR_N tree that represents the terms from each of the lists to be searched is constructed. The tree is traversed to logically combine each of the first list terms with each of the second list terms to form sub-queries, which are executed in parallel, to search a document database or document databases. The results from each sub-query execution may be subject to a constraint that limits the number of results from each sub-query. The sub-query results identify the location of matching query terms in the documents searched that contain the matching query terms, preferably in the form of an ordinal number. The sub-query results are combined to construct a query result. Duplicate results are removed before returning the query result.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
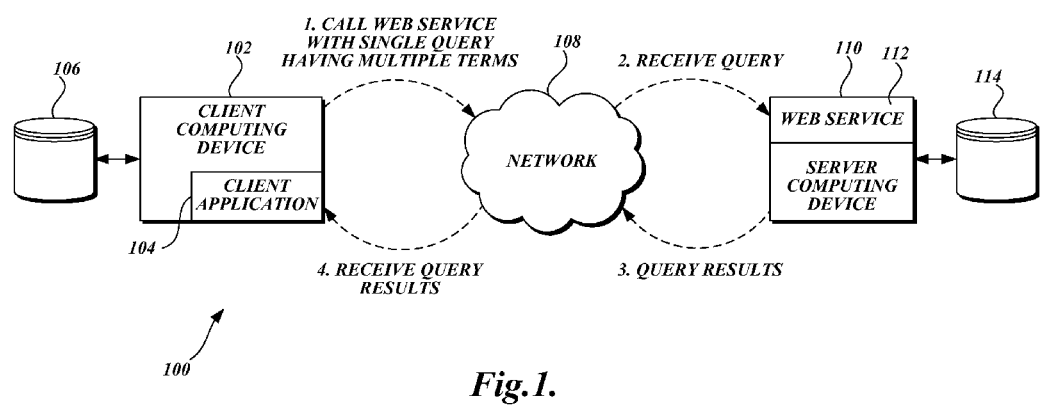
FIG. 1 is a pictorial diagram of an illustrative operating environment suitable for employing high efficiency query processing.

Improving the processing efficiency and the quality of the results returned from queries including a large number, on the order of tens, hundreds, or thousands of query terms, and combinations thereof is described. Specifically, providing a high efficiency query processing system and method that break down a large single query submitted to a search engine into a large number of sub-queries processed in parallel and returning the results in a coordinated and integrated manner, as opposed to concatenating the results returned from independent queries, is described. While a system for conducting a search on a database server that receives single queries from client machines and returns query results to the client machines is described, it is to be understood that the search could be conducted in a database located on the client machine as well and/or on a plurality of database servers, etc.

Although the above description and the detailed description that follows describes trademark document clearance searches, it will be appreciated by those skilled in the art that the described processes are not limited to such searches. Additionally, even though the following descriptions may refer to textual information, such as words and phrases, those skilled in the art will appreciate that the techniques and systems described are equally applicable to other kinds of data, such as multimedia content and other types of information, describable in terms of words and phrases.

Although specific operating environments, system configurations, user interfaces, and flow diagrams are illustrated and/or described, it should be understood that the examples provided are not exhaustive and should not be construed as limiting the description to the precise forms and embodiments described. Persons skilled in the field of computer programming will recognize that the components and process elements described herein may be interchangeable with other components or elements or combinations of components or elements and still achieve the described benefits and advantages. Although the present description may refer to the Internet, persons skilled in the art will recognize that other network environments that include local area networks, wide area networks, and/or wired or wireless networks, as well as standalone computing environments, such as personal computers, may also be suitable. In addition, although the below description describes a client-server architecture, those skilled in the art will recognize that the described processes may be implemented in a peer-to-peer network as well.

As will be appreciated by those skilled in the art, the following description is presented largely in terms of logic operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

In the following descriptions, numerous specific details are set forth in order to provide a thorough understanding of the disclosed embodiments. However, it will be apparent to one skilled in the art that the described processes may be practiced without some or all of these specific details. In other instances, well-known elements have not been described in detail in order not to unnecessarily obscure the description.

FIG. 1 depicts an illustrative system 100 suitable for employing high-efficiency query processing that also depicts a sample query processing operation. The system 100 includes a server computing device 110 running a query processing Web Service 112. Web services are program components that allow an application program to be built that is independent of any particular computer platform. Web services enable disparate application programs to exchange data using Web protocols such as HTTP (Hyper Text Transfer Protocol), XML (Extensible Markup Language), SOAP (Simple Object Access Protocol), etc. A Web service component embodies certain logic and functionality provided to various application programs through standard Web protocols such as HTTP, XML, and SOAP. An application program can call a Web service function to access and utilize the functionality provided by the Web service. In effect, the Web service constitutes a non-integrated component available to application programs. A data store 114 is coupled to the server computing device 110. The data store 114, which may comprise a plurality of data stores, includes one or more databases. Alternatively, the data store 114 may be a local data store or a remote database coupled to the server computing device 110 via a network 108, such as the Internet. The Web Service 112 may include a search engine that operates in conjunction with the data store 114 to conduct queries. Alternatively, the Web Service 112 may be coupled to a search engine embodied in a separate computing device. Still further, the data store 114 may include indexed information used by the search engine included in the Web Service 112.

The server computing device 110 is typically coupled via a computer network 108, such as the Internet, to a plurality of client computing devices 102, only one of which is shown in FIG. 1. The client computing device 102 includes a client application 104 that generates queries based on instructions received from a user of the client computing device 102. A data store 106 is coupled to the client computing device 102. The data store 106 may be a local device such as a disk drive. Alternatively, the data store 106 may be a local or remote data store. The data store 106 typically stores data files including lists that may include tens, hundreds, or thousands of terms used to search for matches in documents stored in the Web Service data store 114 in the manner herein described.

As shown by the numbered dashed lines in FIG. 1, the client application 104 of the client computing device, in response to user input, initiates a query by sending a single query with multiple terms to the Web Service 112 via the network 108. The details of such a query are described below. The received query is processed in the manner described herein by the Web Service to find matches in documents stored in the data store 114. The Web Service 112 returns the query results via the network 108 to the client application 104 running on the client computing device 102. The client computing device stores and displays the results.

Figure 2A:
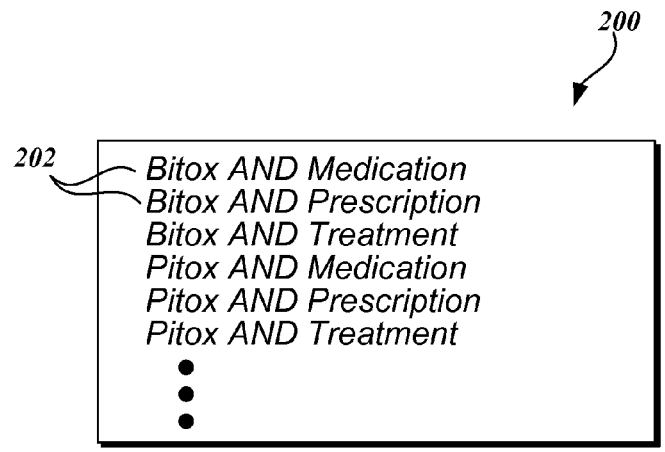
FIG. 2A is a pictorial diagram of an illustrative document query comprising a sequence of separate queries each comprising a word chosen from each of two lists, one list containing proposed trademarks/service marks or phonetic equivalents and the other list containing industry terms, specifically goods and services industry terms.
Figure 2B:
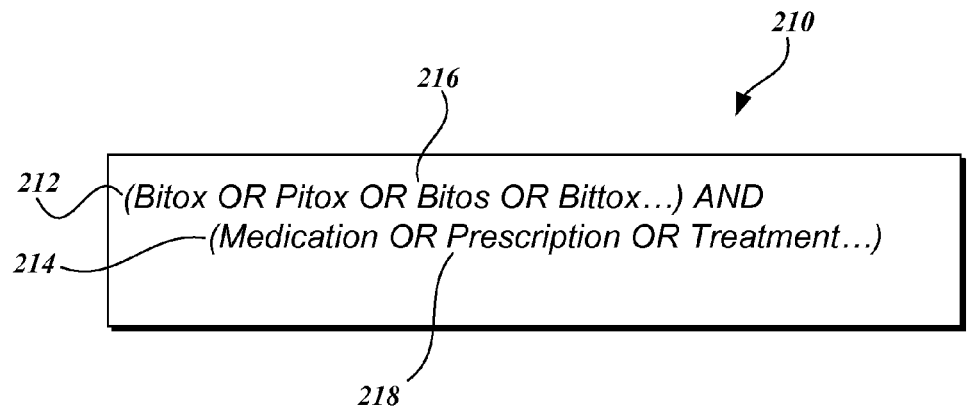
FIG. 2B is a pictorial diagram of an illustrative single document query comprising a logical combination of two separate lists, the first list including proposed trademarks/service marks or phonetic equivalents and the second list including industry terms, specifically goods and services industry terms, that is logically equivalent to the illustrative document query of FIG. 2A.

The herein described high efficiency document search is ideally suited for searching documents to determine if the documents include both potential trademarks or service marks, including phonetic and/or visual equivalents, and the goods and/or services with which the marks are to be used. Such trademark document clearance searches typically include pairs of related terms, one term being a proposed trademark/service mark, or a phonetic or visual equivalent, and the other term being an industry term for the goods or services with which the proposed mark is to be used. FIG. 2A depicts an illustrative composite trademark query comprising a series of separate trademark queries, each including a word chosen from each of the two lists, one list containing a proposed trademark (or trademarks) and phonetic or visual equivalents and the other list containing industry terms for the goods and/or services with which the trademark is to be used. As noted above, FIG. 2B is an equivalent single query representation of the illustrative series of queries illustrated in FIG. 2A. The FIG. 2A series of separate trademark queries comprises a series of queries, each of which includes one term 216 or 218 from each of two lists 212 and 214 (shown in FIG. 2B), and FIG. 2B illustrates a logical combination that combines all of the queries in the series into a single query.

Figure 2C:
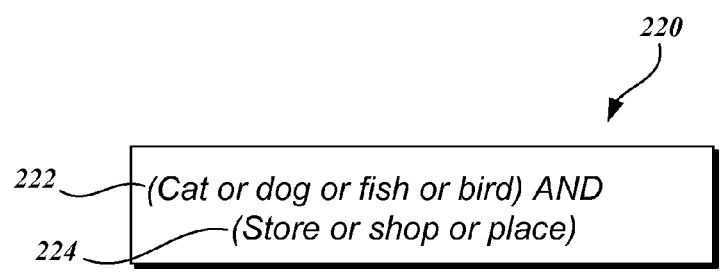
FIG. 2C is a pictorial diagram of an illustrative single document query comprising a logical combination of two separate lists, the first list including pet animals, and the second list including locations that sell pet animals.

How a query or queries are represented can affect how documents in a database are searched. For example, if a series of queries of the type shown in FIG. 2A are created by a user, normally each query 202 will be transmitted from the client application 104 to the Web Service 112 as a separate query, adding to communication overhead. In contrast, if the query series is logically combined into a single query of equivalent scope, as shown in FIG. 2B, a single communication can be used to communicate the query from the client application 104 to the Web Service 112, thereby reducing query communication overhead. Of course, the single query shown in FIG. 2B may be divided into sub-queries, similar to the series of queries shown in FIG. 2A, by the Web Service 112. FIG. 2C illustrates another example of a query comprising two lists, similar to the query of FIG. 2B discussed above. FIG. 2C is a pictorial diagram of an illustrative single document query 220 comprising a logical combination of two separate lists, the first list including pet animals, and the second list including locations that sell pet animals. Logical combinations of the pet animals from the first list 222 and the locations that sell pet animals from the second list 224 are used to form sub-queries for further processing discussed below.

Figure 3A:
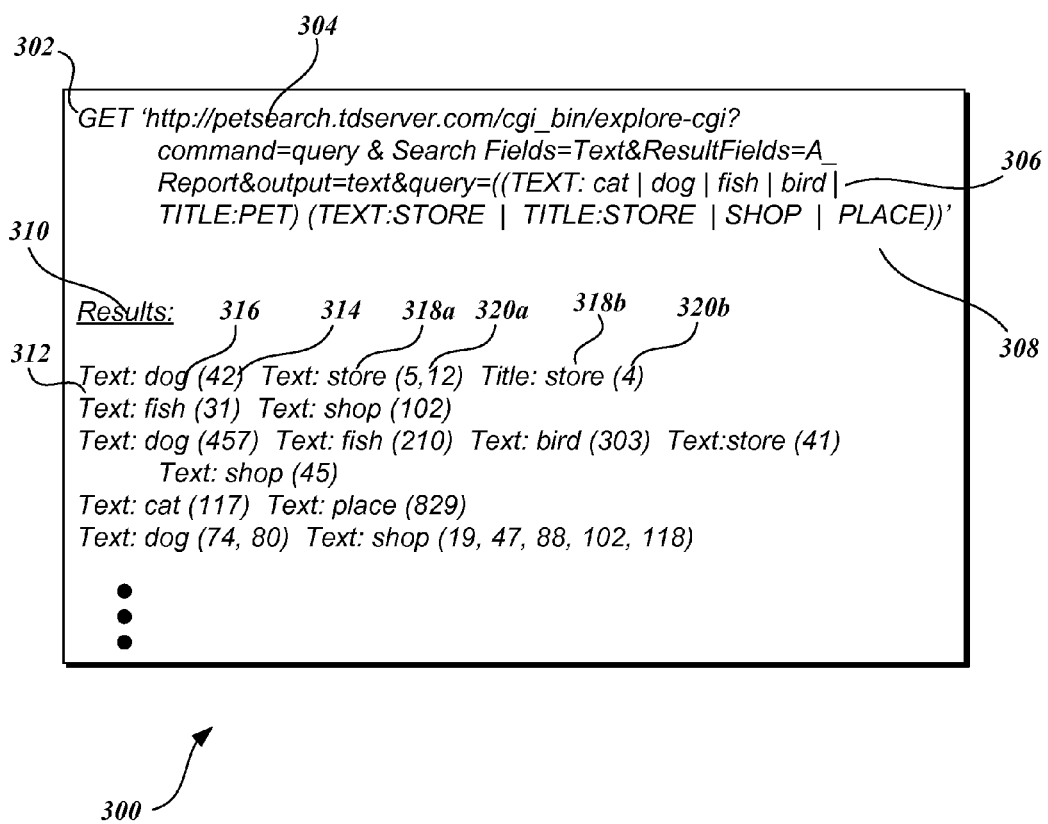
FIG. 3A is a pictorial diagram of an illustrative high efficiency query and returned results.

One way to improve results quality and search efficiency is to reduce the number of individual queries, eliminate results duplication, and improve the usefulness of the information included in query results. FIG. 3A is a pictorial diagram of an illustrative high-efficiency query 300 and the corresponding results. The high efficiency query 300 illustrated in FIG. 3 includes an HTTP (Hyper Text Transport Protocol) GET command 302 that includes a list of pet animals 306 and a list of terms referring to places 308 where the pet animals might be sold, as part of a URI (Uniform Resource Identifier) 304. In this example, the user is searching for certain types of animals (cat, dog, fish, or bird) in the text field of the documents being searched, or the word pet in the title field of the documents. The user is simultaneously searching for the word store in the text field of the documents or the words store, shop or place in the title field of the documents. Results 310 include matches 312 comprising the term being searched, such as dog 316 and an ordinal number 314 indicating the numerical position of term in the text field of the document. Sale locations 318, such as store 318a, 318b, are likewise included in the results 310, along with ordinal numbers 320a, 320b, indicating the position of the location terms in the text/title field(s) of the document.

Figure 3B:
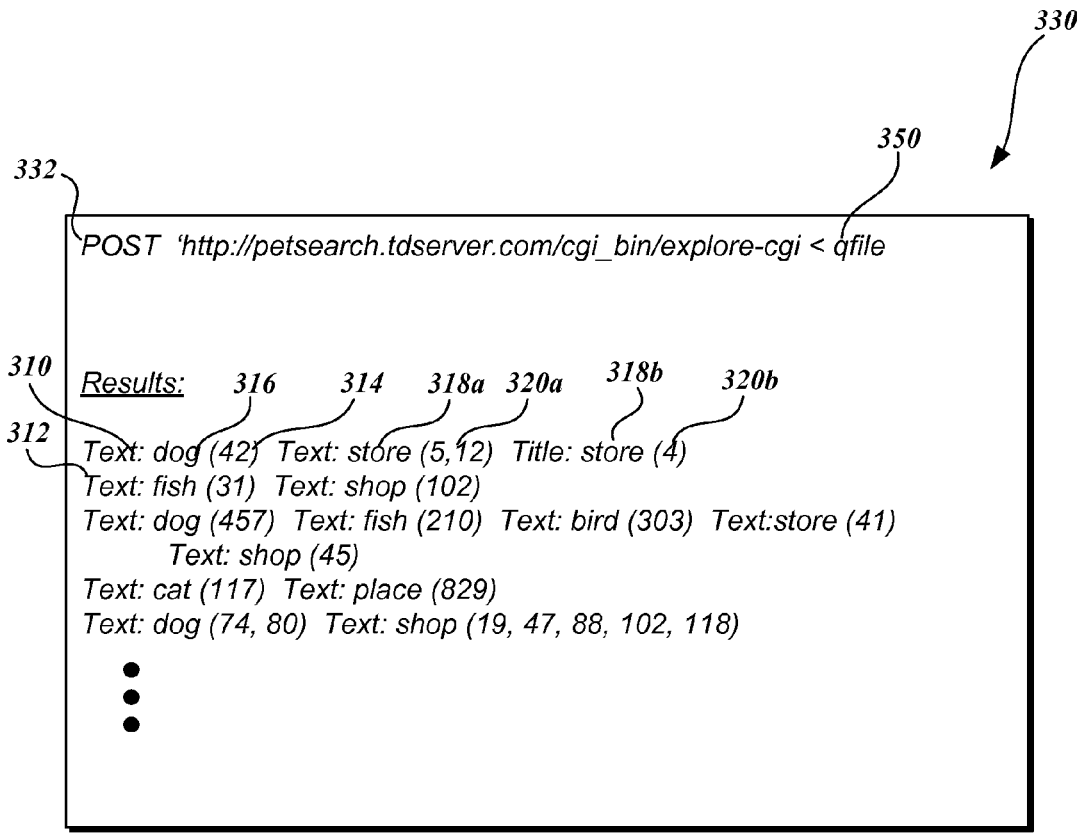
FIG. 3B is a pictorial diagram of an illustrative high efficiency query using a query data file for transmission of query data, and returned results.
Figure 3C:
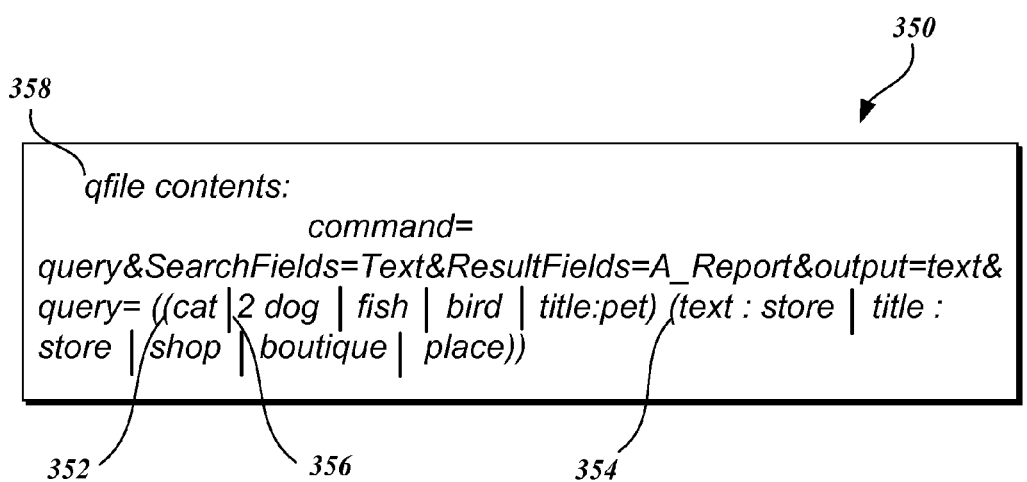
FIG. 3C is a pictorial diagram of an illustrative query data file suitable for use on FIG. 3B.

FIG. 3B is a pictorial diagram 330 of an illustrative high efficiency query similar to FIG. 3A that uses a query data file 350 in place of the list of pet animals 306 and the list of place terms 308. More specifically, the high efficiency query 330 includes an HTTP POST command 332 that obtains the query data from the query data file 350. An illustrative query data is illustrated in FIG. 3C. The HTTP POST command is used to send data separately from the command itself, such as via a data file. Other than using the POST command instead of the GET command, and using a data file 350, FIGS. 3A and 3B depict equivalent queries. As noted above, FIG. 3C depicts an illustrative query data contained in the query file 350. Query file contents 358 include the list 352 of pet animals and the list 354 of locations that sell the pet animals. Data item 356, i.e., 12, is an example of an OR_N operator with N equal to 2. The use of the OR_N operator is further discussed with respect to FIGS. 4C and 7 below.

Figure 4A:
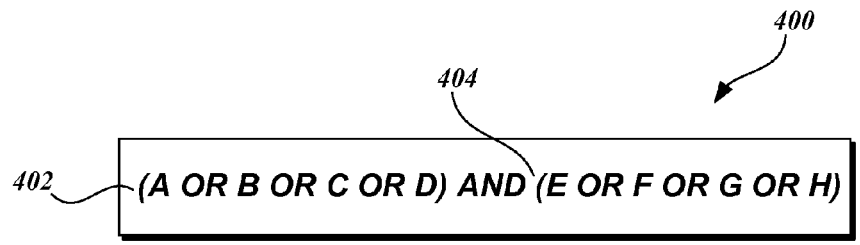
FIG. 4A is a pictorial diagram of the logical structure of an illustrative high efficiency query.

FIG. 4A is a pictorial diagram of the logical structure of an illustrative high-efficiency query 400. The logical structure is similar to FIG. 2B. More specifically, FIG. 4A includes a first list 402 that may, for example, comprise potential trademarks (and visual or phonetic equivalents, if desired), and a second list 404 that may comprise industry terms for the goods and services with which the potential trademarks are to be used. For ease of illustration, the search terms, which could be words, strings, or phrases, for example, that are included in the two lists are represented by letters—A, B . . . and E, F . . .

Figure 4B:
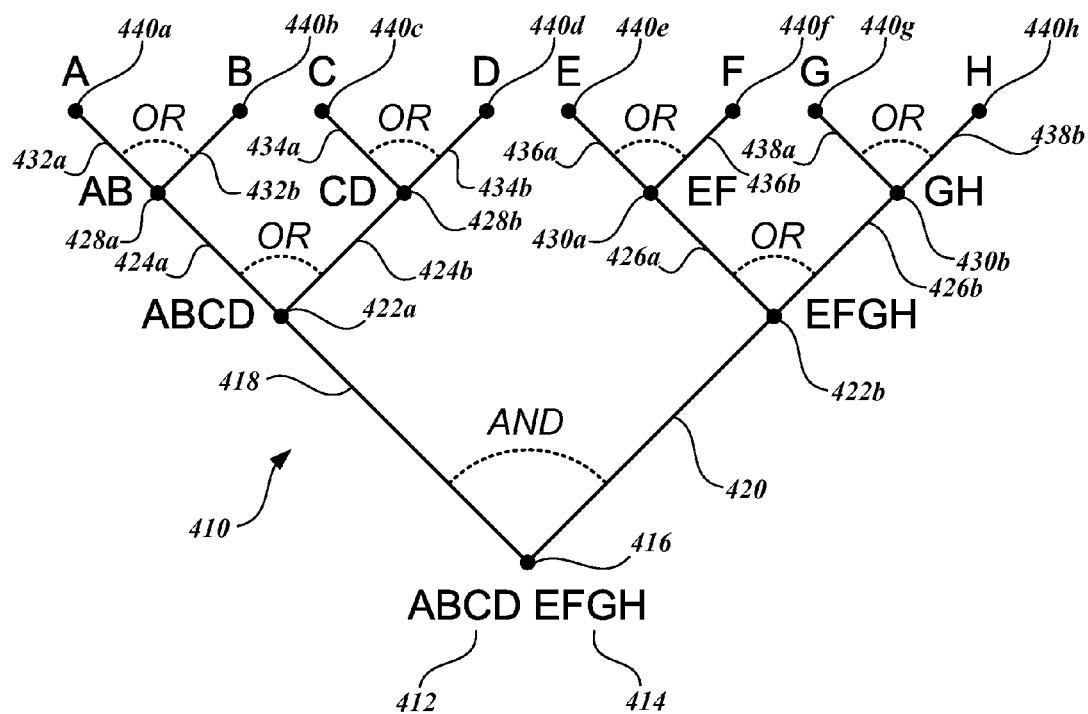
FIG. 4B is a pictorial diagram of an illustrative AND-OR tree structure suitable for use in the processing a high efficiency query of the type illustrated in FIG. 4A.

The search terms shown in FIG. 4A may be organized as illustrated in FIG. 4B. More specifically, FIG. 4B is a pictorial diagram of an illustrative AND-OR parse tree suitable for use in the processing of a high-efficiency query of the type illustrated in FIG. 4A. As well known to those skilled in the art, an AND-OR parse tree 410 is a data structure used to organize and parse data for computerized processing. In this example, the two lists 412 and 414 form the root 416 of the tree 410, which is an AND node. Each list 412 and 414 also forms a branch 418 and 420 of the root node 416. Each branch 418 and 420 terminates at an OR-node 422a, 422b that subdivides each list in half into two smaller branches 424*a*, 424*b* and 426*a*, 426*b*. The half lists are further subdivided at lower level nodes 428*a*, 428*b* and 430*a*, 430*b* into yet smaller branches 432*a*, 432*b*, 434*a*, 434*b*, and 436*a*, 436*b*, 438*a*, 438*b*. In this example, branching ends at this level, at leaves 440*a*-440*h*. Additional sub-branching occurs with more extensive lists of search terms.

During document searching, the parse tree 410 is traversed from the root node 416 towards the leaves of the tree 424. As this occurs, combinations of the leaves are taken two at a time and used to form a sub-query that is used to search the indexed data store 114 for matches in the index of file documents included in the documents stored in the data store or in the documents themselves if no index is included in the data store. As described more fully below, each sub-query is implemented as a separate thread and executed in parallel with other sub-queries in order to save processing overhead. More specifically, in order to save communication overhead, a single query is submitted via one call to the Web Service 112 from the client application 104 in a form such as that shown in FIG. 4A. Upon receipt, the sub-queries are generated internally by the Web Service 112 thereby saving the overhead associated with communicating hundreds or thousands of single queries from the client application 104 to the Web Service 112. The results of the sub-queries are integrated and coordinated prior to returning results to the client application 104. For example, the Web Service 112 may compare the results of the execution of all sub-queries and eliminate any redundancies. Such integration is either not possible or extremely difficult and time consuming with individual queries. Generating sub-queries at the Web Service 112 reduces query communication overhead and provides the ability to eliminate results redundancy.

Figure 4C:
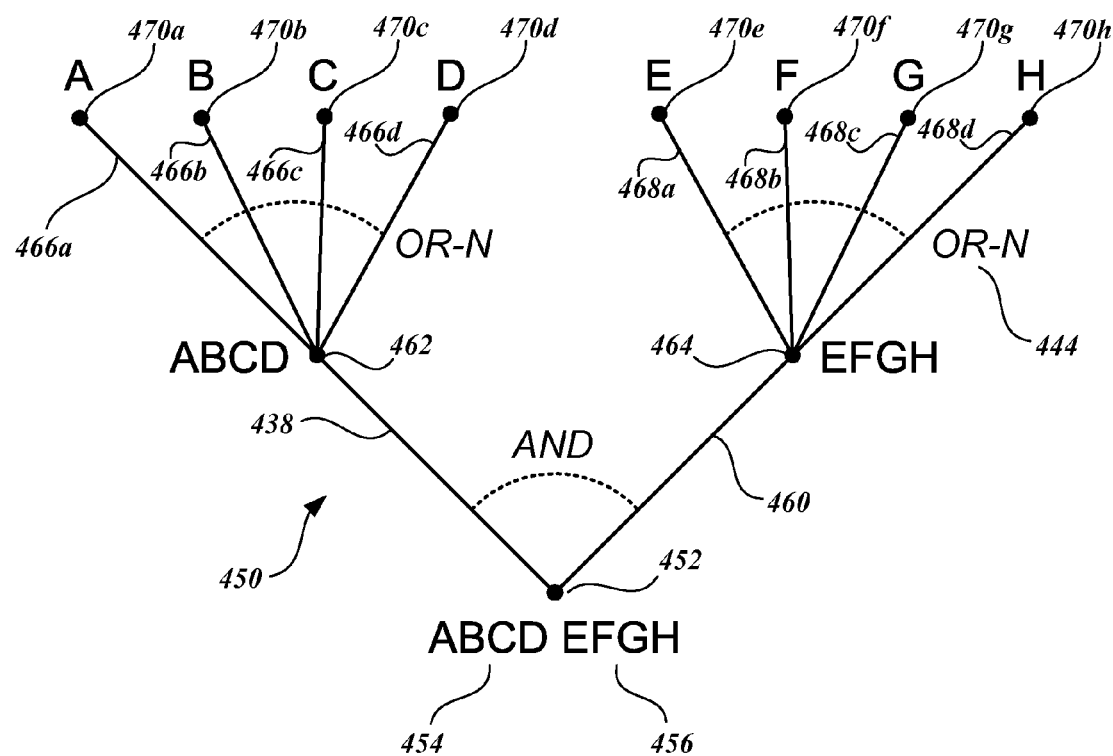
FIG. 4C is a pictorial diagram of a sample AND-OR_N tree structure suitable for use in processing of a high efficiency query of the type illustrated in FIG. 4A.

FIG. 4C is a pictorial diagram of an illustrative AND-OR_N parse tree 450 suitable for use in the processing of a high-efficiency query of the type illustrated in FIG. 4A in a different manner. An AND-OR_N operation parse tree is a variation of an AND-OR parse tree. The AND-OR_N parse tree 450 illustrated in FIG. 4C includes a root AND node 452 formed by the two lists 454 and 456. The two branches 458, 460 of the AND node terminate in AND-OR_N nodes 462 and 464 defined by sub-branches 466*a*, 466*b*, 466*c*, 466*d* and 468*a*, 468*b*, 468*c*, 468*d*, which terminate at leaves 470*a*-470*h*.

An OR_N operation 444 is a logical operation that requires at least N leaves 470*a*-470*d* or 470*e*-470*h* of each list to be present before an executable sub-query. This limitation reduces the number of sub-queries and, thereby, increases search efficiency when compared to a FIG. 4B sub-query type approach. For example, if N is equal to 3, each sub-query must include at least three of the terms from each of the two lists. As a result, in this example, when executed, only documents whose indices include three terms from each of the two lists are identified in the results. If desired, the OR_N operation 444 may include a different number for each of the sub-branches 458, 460 of the parse tree. For instance, for branch 458, the OR_N operation 444 may be an OR_2 operation, while for the branch 460, the OR_N operation 444 may be an OR_3 operation. This means that each sub-query includes two leaves (i.e., two of 470*a*-470*d*) from branch 458 and three leaves, (i.e., three of 470*e*-470*h*), from the branch 460.

As noted above, some searches, such as trademark document clearance searches, often include hundreds or thousands of terms in a single query. It is impractical to enter such a large number of terms manually each time a search is to be conducted. Therefore, preferably the lists are included in a file, making them easily combinable by a user into a single query of the type illustrated in FIG. 4A.

Figure 5:
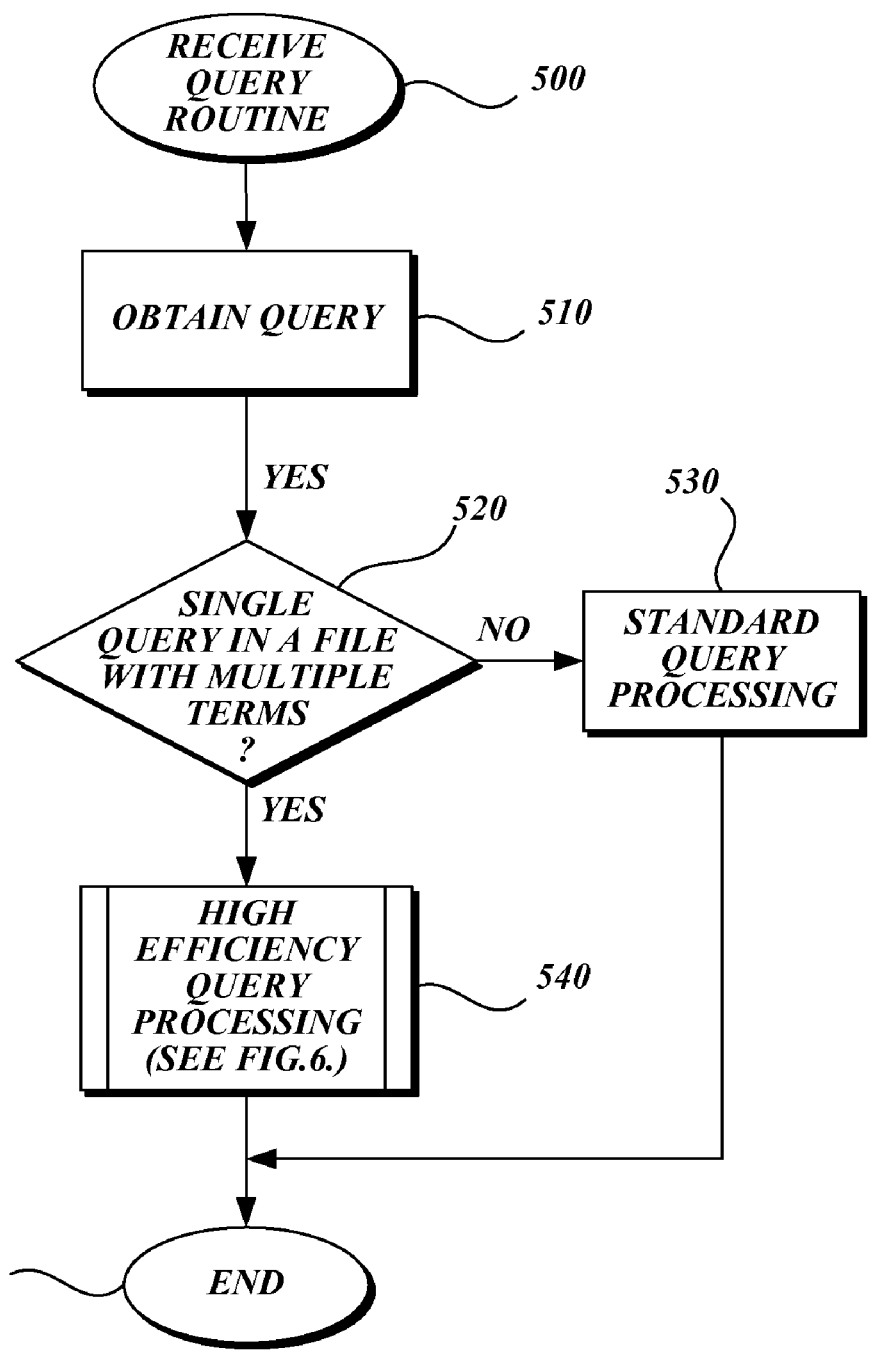
FIG. 5 is a flow diagram of an illustrative routine for receiving and processing a large single query.

FIG. 5 is a flow diagram of an illustrative routine 500 for receiving and processing a large single query of the type illustrated in FIG. 4A. The receive query routine 500 proceeds to block 510 when the Web Service 112 obtains (receives) a query. As depicted in FIG. 1, the query may be transmitted from a client application 104 via a computer network 108 to the Web Service 112. At block 520, the Web Service 112 evaluates the query. If the query is determined to be a single query including at least one list containing a large number of terms, the routine proceeds to block 540 where a high-efficiency query processing routine is invoked. The number of terms threshold required to invoke the high-efficiency query processing routine may be determined as part of a protocol that establishes the connection between the client application 104 and the Web Service 112. Alternatively, the number of terms threshold required to invoke the high-efficiency query processing routine may be a default setting established by the Web Service 112. The number of terms threshold may also be indicated via a call parameter in a function call to the Web Service 112.

Returning to block 520, if it is determined that the query is not a single query that includes at least one list with a large number of terms, a standard query processing routine is invoked at block 530. The standard query processing routine lacks the special sub-query processing employed in the high efficiency query processing routine. Regardless of which path is followed, after processing is completed, the received query routine terminates at block 550.

High-efficiency query processing increases the quality of the results of a query search by reducing overhead and eliminating redundancy in the returned results. High-efficiency query processing presents the results in a way that allows the user to more easily focus on the most relevant results. More specifically, preferably, the query results include information that identifies the location of the matching query terms in the index of a matched document or the document itself, whichever is searched, such as an ordinal number. Location information, such as an ordinal number, helps users to determine the relevance of the matched document. Relevance using ordinal numbers can be determined manually or with a computerized filtering process. For instance, if a trademark term such as Bitox is one to four words away from an industry term such as medication, then the matched document can be considered to be more relevant than if the terms were apart by a few hundred words to the issue of whether Bitox is used in this document either as a trademark or as a descriptive term with medication.

Figure 6:
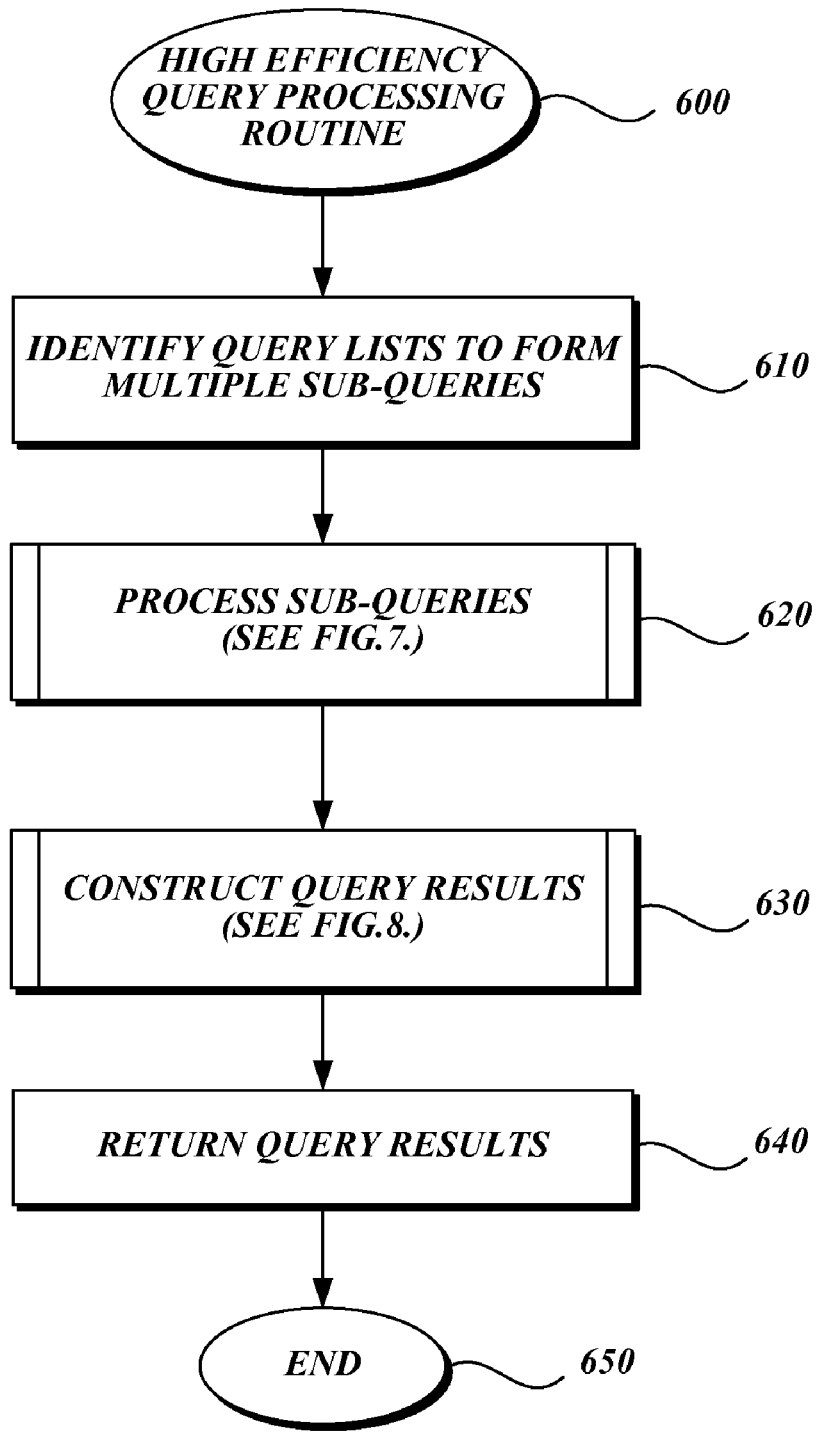
FIG. 6 is a flow diagram of an illustrative high efficiency query processing routine suitable for use in the illustrative large single query receiving and processing illustrated in FIG. 5.

FIG. 6 is a flow diagram of an illustrative high-efficiency query processing routine 600 suitable for use in block 540 of FIG. 5. The high-efficiency query processing routine 600 proceeds to block 610 where query lists are identified in the single query received by the Web Service 112, at least one of which is large. As shown in FIG. 4A and described above, the query list comprises at least two lists. In a trademark document clearance search example, the first list may include proposed trademark or service mark terms (and phonetic and/or visual equivalents) and the second list may include industry terms for the goods and services with which the proposed trademark/service mark(s) is (are) to be used. If desired, the single query may include more than two query lists. As described above with respect to FIGS. 4B-4C, the terms from each of the query lists are logically combined in some manner to form sub-queries.

The high efficiency query processing routine next proceeds to block 620 where the sub-queries are processed. In one illustrative embodiment, the sub-queries may be processed sequentially. In another illustrative embodiment, the sub-queries may be processed partially in parallel. For example, the portions of processing of a sub-query that are not dependent on shared resources, such as a database, may be performed in parallel with the processing of other sub-queries, while the portions of processing that are dependent on shared resources are performed sequentially. In yet another illustrative embodiment, the sub-queries may be processed in parallel. For example, the sub-queries may be processed using separate computing threads executed on the same server computing device 110. Alternatively, the threads may be executed on different server devices in parallel and the results returned to a single (originating or requesting) server computing device 110. As noted above, the different server computing devices executing the sub-queries may search the same data store 114 or different date stores. At block 630, the high-efficiency query processing routine collects the results from the processing of the sub-queries and integrates the results into a single query result. For example, the Web Service 112 of the originating server computing device 110 may integrate the results of the sub-queries processed by a plurality of server computing devices and return the results to the client application 104 as an integrated query result. According to some illustrative embodiments, the individual sub-query results may be returned to the client application 104 and integrated by the client application 104 running on the client computing device 102. Regardless of which computing device performs the integration, the user of the client computing device 102 receives integrated results when the high-efficiency query processing routine proceeds to block 640 where the query results are returned to the client application 104. The high-efficiency query processing routine ends at block 650.

Figure 7:
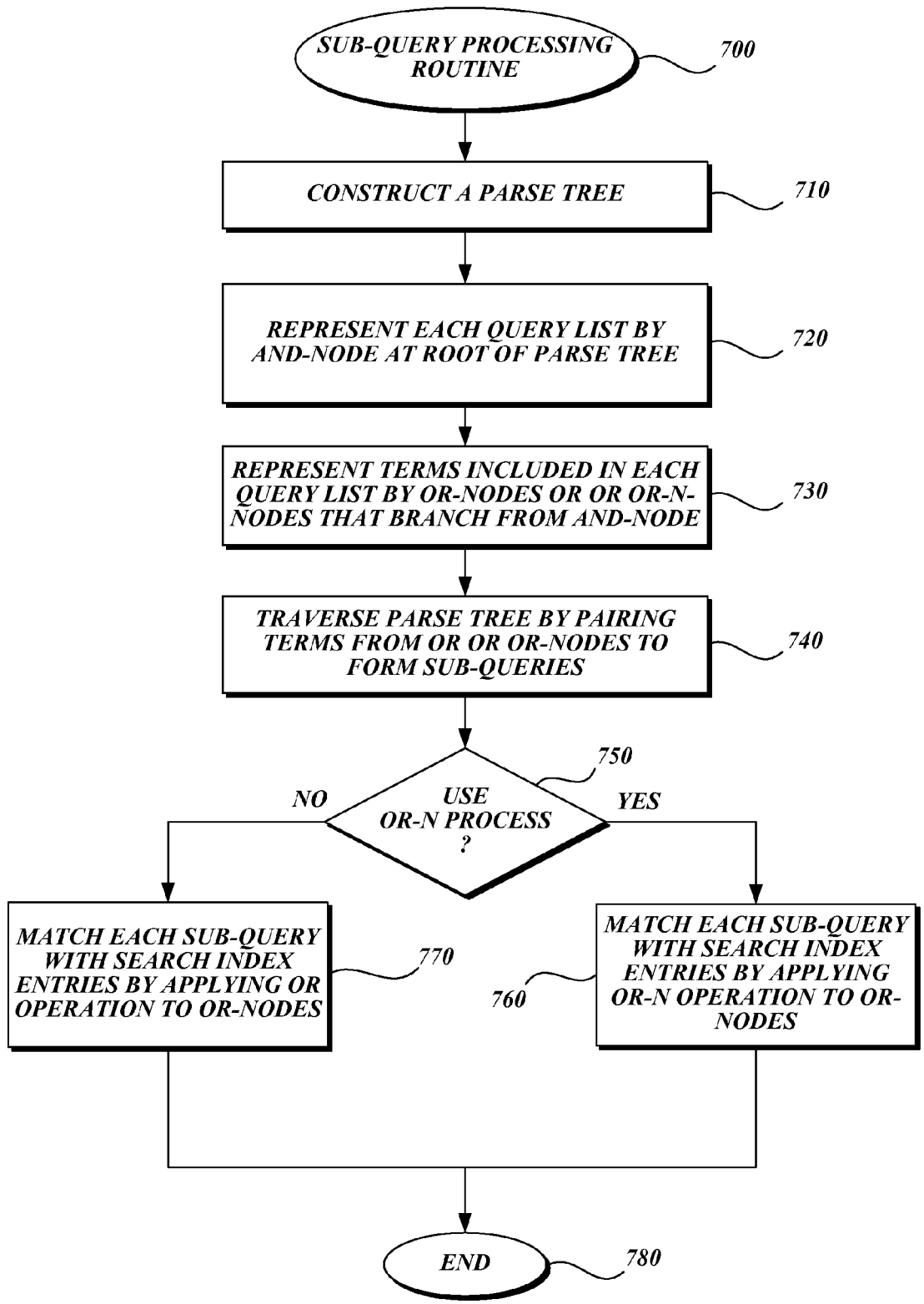
FIG. 7 is a flow diagram of an illustrative sub-query processing routine suitable for use in the illustrative high efficiency query processing routine illustrated in FIG. 6.

FIG. 7 is a flow diagram of an illustrative sub-query processing routine 700 suitable for use in the illustrative high-efficiency query processing routine illustrated in FIG. 6. The sub-query processing routine 700 proceeds to block 710 where a parse tree is constructed, such as a parse tree of the type illustrated in either FIG. 4B or FIG. 4C. Those skilled in the art will appreciate that parse trees are one method of organizing and processing data. There are other methods available for organizing and processing data such as graphs and various lists and tables. As a result, the construction of a parse tree should be construed as illustrative, not limiting. At block 720, each query list included in the query is represented at the root AND node of the parse tree. As shown in FIGS. 4B and 4C, and described above, in the case of two lists the root AND node has two branches, each representing one of the query lists. Next, at block 730, the terms included in each list are represented at the OR or OR_N nodes that terminate at the leaves of the parse tree. Whether the parse tree is an OR node or an OR_N node parse tree is decided by the user with one or the other representing a default decision. In an illustrative embodiment, the OR_N operator 356 is specified as part of the initial query by the user, as illustrated in FIG. 3C. In another illustrative embodiment, the OR_N operator may be the default operator used in the high efficiency query processing routine. In yet another illustrative embodiment, the OR_N operator may be specified during an initial communication setup session between the client computing device 102 and the server computing device 110. If the parse tree is an OR_N parse tree, the value or values of N may be user defined or determined by a default setting. At block 740, the sub-query processing routine traverses the parse tree by pairing terms from one branch of the AND root with terms from the other branch of the AND root to form sub-queries as described above.

At decision block 750, a test is made to determine whether or not to use an OR_N process. As noted above, the use of OR_N is specified by the user as part of the initial query or during a communication setup session. If it is determined that an OR_N process is to be used for traversing the parse tree, the routine proceeds to block 760 where the query searches are conducted in parallel according to the OR_N process. Depending upon the nature of the data store, either the indices of documents stored in data store 114 are searched for matches or the actual documents are searched for matches. Returning to block 750, if it is determined that the OR_N process is not to be used, the routine proceeds to block 770 where the query searches are conducted according to the OR process. Regardless of the path followed, the sub-query processing routine terminates at block 780.

Figure 8:
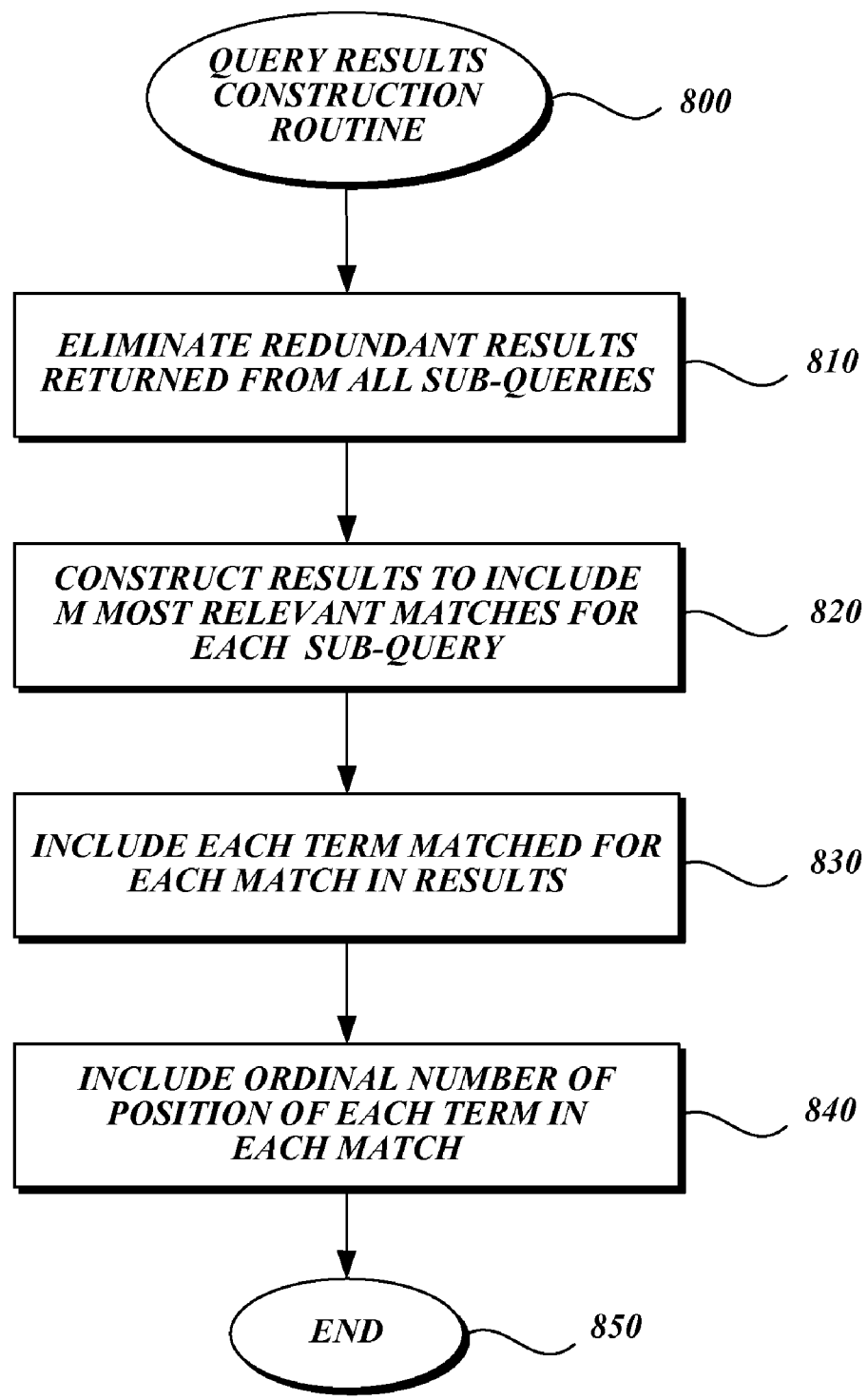
FIG. 8 is a flow diagram of an illustrative constructing query results routine suitable for use in the illustrative high efficiency query processing routine illustrated in FIG. 6.

As shown at block 630 of FIG. 6 and described above, after the sub-query processing routine is completed, the results of all sub-queries are integrated into a single query result to be returned to the client application 104. FIG. 8 is a flow diagram of an illustrative query results construction routine 800 suitable for integrating the sub-query results into a single query result that is suitable for use in the illustrative high-efficiency query processing routine illustrated in FIG. 6 and described above. The query results construction routine 800 proceeds to block 810 where duplicate results return from sub-queries are eliminated. The results of all sub-queries may be compared to identify documents matching more than one sub-query. Documents with multiple matches are included in the query result only once, with the single entry including all matched terms in the common documents. In one embodiment, the document matching multiple sub-queries may be included in the query results only if the matched document has a relevance score above a predetermined threshold based on the number of term matches. Each matched document that meets any such filtering test and the terms included in the index of that document (or the document itself, depending on what is searched) are identified in the query results. At block 820, if desired, the results returned for each sub-query are limited to a sub-query results limit. For example, one sub-query results limit may be applied to all sub-queries. Alternatively, different sub-query results limits may be applied to different sub-queries. The sub-query results limit may be predetermined, or the sub-query results limit may be included in the initial query sent by the client application 104. Alternatively, the sub-query results limit may be determined dynamically based on some predetermined criteria. For example, the sub-query results limit for a sub-query may be determined dynamically based on the number of results returned from previously executed sub-queries. Next, at block 830, each matched term is identified in the query results. At block 840, the ordinal number of the position of each matching term (or some other position identifier) in the index of each matched document (or the document itself) is added to the query result, as shown in FIG. 3. If desired, in addition to the ordinal number of each matching term in the matched document, the distance between the matching term from one query list and the corresponding term from the other list in the sub-query may be added to the query result. The query results construction routine ends at block 850.

While illustrative embodiments have been illustrated and described, it will be appreciated that various changes can be made therein without departing from the spirit and scope of the invention. In this regard, as will be readily understood by those skilled in the art and others various ones of the blocks may be eliminated as optional in some embodiments and/or additional blocks may be added. Further, in some embodiments the functions represented by the blocks may occur in The embodiments of the invention in which an exclusive property or privilege is claimed are defined as follows:

1. A computer-implemented document search method comprising, by execution of program instructions by a computer system that comprises one or more computing devices:
   in response to receiving a query including first and second lists of query terms, logically combining terms from the first and second lists to form document search sub-queries, each sub-query comprising at least one term from the first list and at least one term from the second list;
   searching a data store by executing the sub-queries such that at least two of the document search sub-queries are executed in parallel, to identify responsive documents;
   obtaining results from executing the document search sub-queries, the results including location information identifying the location of any of the terms from the first and second lists in the responsive documents;
   combining the results from all sub-queries to form a single query result that includes the location information; and
   returning the query result.

2. The method of claim 1, further comprising constructing an AND-OR tree to represent the terms included in the first and second lists of query terms.

3. The method of claim 1, further comprising constructing an AND-OR_N tree to represent the terms included in the first and second lists of query terms.

4. The method of claim 3, wherein the AND-OR_N tree is traversed using an OR_N logical process on the first and second lists of query terms.

5. The method of claim 1, wherein the first list includes more than one hundred terms.

6. The method of claim 5, wherein the second list includes more than one hundred terms.

7. The method of claim 1, wherein the first list includes more than a thousand terms.

8. The method of claim 7, wherein the second list includes more than a thousand terms.

9. The method of claim 1, including limiting the number of results obtained from each sub-query to a predetermined number.

10. The method of claim 1, wherein the information that identifies the terms from the first and second lists is an ordinal number that represents the position of the query term in the document.

11. The method of claim 1, further comprising removing duplications from the single query result.

12. A computer-implemented system for document searching, the system comprising:
   (a) a computing system that comprises one or more computing devices coupled to a computer network said computing system operable to receive queries;
   (b) a data store coupled to the computing system operable to store document data in a form suitable for computerized searching; and
   (c) a software search component running on the computing system that, in response to the computing system receiving a query that includes first and second lists of query terms:
      (i) logically combines the first and second lists of query terms to form sub-queries, each sub-query comprising at least one term from the first list and at least one term from the second list;
      (ii) searches the data store by executing the sub-queries such that at least two of the sub-queries are executed in parallel;
      (iii) obtains results from each sub-query execution, the results including information that identifies the locations of the terms from the first and second lists in the document data stored in the data store;
      (iv) combines the results from all sub-queries to create a single query result;
      (v) removes duplicate results from the single query result; and
      (vi) returns the single query result.

13. The system of claim 12, wherein the data store comprises a local database, a remote database, or a distributed database.

14. The system of claim 12, wherein the software search component comprises a Web service.

15. The system of claim 13, wherein the Web service includes a search engine.

16. The system of claim 12, further including a search engine running on the computing system.

17. The system of claim 16, wherein the search engine is coupled to the software search component.

18. The system of claim 12, wherein the first and second lists of query terms are represented in said computing system by an AND-OR tree that is processed by the software search component.

19. The system of claim 12, wherein the first and second lists of query terms are represented in said computing system by an AND-OR_N tree that is processed by the software search component.

20. The system of claim 19, wherein the AND-OR_N tree is traversed using an OR_N logical operation.

21. The system of claim 12, wherein at least one of the first and second lists of query terms includes more than one hundred terms.

22. The system of claim 12, wherein at least one of the first and second lists of query terms includes more than a thousand terms.

23. The system of claim 12, wherein the number of results from each sub-query is limited to a predetermined number.

24. The system of claim 12, wherein the information that identifies the locations of the terms from the first and second lists in the document data is comprises an ordinal number that represents the position of each term in the document.

25. A computer-implemented document search method performed by a computing system configured with computer executable instructions, the method comprising:
   executing sub-queries for searching a data store such that at least two search sub-queries are executed in parallel, wherein the search sub-queries are formed by logically combining each of a plurality of query terms from a first list with each of a plurality of query terms from a second list; and
   obtaining results from each sub-query execution, the results including information that identifies the location of each of the query terms in document data stored in the data store.

26. The method of claim 25 further comprising:
   combining the results from all sub-queries to create a single query result; and returning the single query result.

27. The method of claim 26 further comprising removing duplicate results from the single query result.

28. A computer-implemented system for document searching, the system comprising:
   a data store;

a computing system that comprises one or more computing devices said computing system coupled to the data store; and a Web service running on the computing system operable to form sub-queries by logically combining each of a plurality of query terms from a first list with each of a plurality of query terms from a second list, executing the sub-queries such that at least two of the sub-queries are executed in parallel, and obtaining results from each sub-query execution, the results including information that identifies the location of each of the query terms in document data stored in the data store.

29. The system of claim 28, wherein the results for all sub-queries are combined to create a single query result.

30. The system of claim 29, wherein duplicate results are removed from the single query result.

31. The system of claim 29, wherein each sub-query includes at least N query terms for at least one of the first list and the second list.

32. The system of claim 29, wherein each sub-query includes at least N query terms from the first list and M query terms from the second list.

33. A computer-implemented method for document searching by execution of program instructions by a computer system that comprises one or more computing devices, the method comprising:
 in response to receiving a query including first and second lists of query terms, logically combining the terms from the first and second lists to form document search sub-queries, each sub-query comprising at least a term from the first list and at least a term from the second list;
 searching a data store by executing the document search sub-queries such that at least two of the document search sub-queries are executed in parallel to identify documents that contain terms of first and second lists of query terms;
 obtaining results from executing the document search sub-queries;
 limiting the number of results obtained from each sub-query to a predetermined number;
 combining the predetermined number of results obtained from each sub-query to create a single query result; and
 returning the single query result.

34. The method of claim 33, further comprising constructing an AND-OR tree to represent the terms included in the first and second lists of query terms.

35. The method of claim 33, further comprising constructing an AND-OR_N tree to represent the query terms included in the first and second lists of query terms.

36. The method of claim 35, wherein the AND-OR_N tree is traversed using an OR_N logical process on the first and second lists of query terms.

37. The method of claim 33, wherein the first list includes more than one hundred query terms.

38. The method of claim 37, wherein the second list includes more than one hundred query terms.

39. The method of claim 33, wherein the first list includes more than a thousand query terms.

40. The method of claim 39, wherein the second list includes more than a thousand query terms.

41. The method of claim 33, including limiting the number of results obtained from each sub-query to a predetermined number.

42. The method of claim 33, further comprising removing duplications from the single query results.

43. The method of claim 1, wherein said sub-queries are formed in response to a determination that the size of the first or second lists exceeds a threshold.

44. The method of claim 1, wherein at least one of the lists of query terms is selected from a file containing one or more lists of terms.

45. The system of claim 12, wherein the software search component only forms said sub-queries when the size of the first or second lists exceeds a threshold.

46. The method of claim 12, wherein at least one of the lists of query terms is selected from a file containing one or more lists of terms.

47. The system of claim 25, wherein the sub-queries are executed only when the size of the first or second lists exceeds a threshold.

48. The method of claim 25, wherein at least one of the lists of query terms is selected from a file containing one or more lists of terms.

49. The system of claim 28, wherein the sub-queries are executed only when the size of the first or second list of terms exceeds a threshold.

50. The method of claim 28, wherein at least one of the lists of query terms is selected from a file containing one or more lists of terms.

51. The system of claim 33, wherein the sub-queries are formed in response to a determination that the size of the first or second list of terms exceeds a threshold.

52. The method of claim 33, wherein at least one of the lists of query terms is selected from a file containing one or more lists of terms.

* * * * *